United States Patent [19]

Kniffler

[11] Patent Number: 4,846,559

[45] Date of Patent: Jul. 11, 1989

[54] SENSOR ELEMENT WITH A MEMORY FOR ABNORMAL CHANGES OF THE INCIDENT LIGHT INTENSITY

[75] Inventor: Norbert Kniffler, Egmating, Fed. Rep. of Germany

[73] Assignee: Messerschmitt Bölkow-Blohm GmbH, Munich, Fed. Rep. of Germany

[21] Appl. No.: 3,953

[22] Filed: Jan. 16, 1987

[30] Foreign Application Priority Data

Jan. 30, 1986 [DE] Fed. Rep. of Germany ....... 3602796

[51] Int. Cl.⁴ .............................................. G02F 1/13
[52] U.S. Cl. .................................... 350/342; 350/332; 350/333; 350/334
[58] Field of Search ............... 350/332, 333, 334, 353, 350/355, 342; 365/108, 113-115; 340/784, 708, 707

[56] References Cited

U.S. PATENT DOCUMENTS

| | | | |
|---|---|---|---|
| 3,631,411 | 10/1969 | Kosonocy | 350/334 X |
| 3,824,003 | 7/1974 | Koda et al. | 350/334 X |
| 4,062,626 | 12/1977 | Kawakami et al. | 340/784 X |
| 4,432,610 | 2/1984 | Kobayashi et al. | 350/333 |
| 4,545,111 | 10/1985 | Johnson | 350/334 X |
| 4,655,552 | 4/1987 | Togashi et al. | 350/342 |
| 4,679,909 | 7/1987 | Hamada et al. | 340/707 X |

FOREIGN PATENT DOCUMENTS 2210387 9/1973 Fed. Rep. of Germany ...... 340/784

OTHER PUBLICATIONS

Szydlo et al., "New Amorphous Silicon Nonlinear Element for Liquid Crystal Display Addressing", Appl. Phys. Lett. 44(2), Jan. 15, 1984, pp. 205-206.
Millman et al., *Electronic Devices and Circuits*, pp. 580-586, McGraw-Hill, 1967.

*Primary Examiner*—Stanley D. Miller
*Assistant Examiner*—Huy Kim Mai
*Attorney, Agent, or Firm*—Kenyon & Kenyon

[57] ABSTRACT

A sensor element with a memory for changes of the incident light intensity. The sensor element comprises a light-sensitive element connected in series with a fixed resistor, and a light modulator shunted either across the light-sensitive element or the resistor. The light modulator influences the incidence of light onto the light-sensitive element. The reflection, absorption and/or transmission behavior of the light modulator changes as a function of the applied voltage or the current. The sensor element according to the invention has the advantage that it can be manufactured simply and cost-effectively so that it is also suitable for use in large arrays.

14 Claims, 2 Drawing Sheets

SENSOR ELEMENT WITH A MEMORY FOR ABNORMAL CHANGES OF THE INCIDENT LIGHT INTENSITY

BACKGROUND OF THE INVENTION

The present invention relates to a sensor element having a memory for abnormal changes of the incident light intensity.

The invention is based on the following consideration: In a number of cases it would be advantageous to have available a sensor element which has a "memory" for abnormal changes of the incident light intensity. With such a sensor element, a light control, for instance, could be realized which can be switched on or activated by a light flash and subsequently keeps, for instance, the light of an illuminating unit at a given value. A further application of such a sensor element would be a light control unit which, after a light failure, does not "start again" automatically but makes provision that after an unintended extinction of the light, the light is regulated to the previously set value only if, for instance, an operator gives a specific command therefor.

Such light control circuits can, of course, be realized with sensor elements which are followed by a logic or microprocessor circuit. A sensor element of simple design with a memory for abnormal changes of the incident light intensity, however, is not known. Such a sensor element, however, would be desirable especially if a number of such sensor elements is to be arranged in an array in order to take care, for instance, of complicated monitoring functions. It goes without saying that it is not tolerable for cost reasons to provide a microprocessor for each sensor element.

SUMMARY OF THE INVENTION

It is, therefore, an object of the present invention to provide a sensor element having a "memory for abnormal changes of the incident light intensity" which is of simple design and is in particular also suited for integration in an array of such sensor elements.

The above and other objects of the present invention are achieved by a sensor element having a memory for changes of the incident light intensity, comprising a light sensitive element connected in series with a fixed resistor, either the light-sensitive element or the resistor being shunted by a light modulator which influences the light incident on the light-sensitive element, the reflection, absorption and/or transmission behavior of the light modulator changing as a function of the voltage applied or the current.

Surprisingly, a solution of this problem stated in accordance with the invention is possible by the provision that a light-sensitive element is connected in series with a fixed resistor and a light modulator and in particular, a liquid crystal element is shunted either across the light-sensitive element or the resistor, which influences the light path to the light-sensitive element. This light modulator can have the property that, depending on the design, it either reflects the incident light if the applied voltage is high or low and is light-transparent if the voltage is low or high. This light transmission characteristic of the light modulator which is different depending on the applied voltage is present, for instance, in liquid-crystal elements and is utilzied, according to the invention, to activate or deactivate the light-sensitive element when an abnormal light intensity occurs. A light modulator with voltage-dependent transmission behavior can be arranged, for instance, in the light path ahead of the light sensitive element. However, it can also reflect the light onto the light-sensitive element.

The light mdulator can, of course, also change its absorption and/or polarization properties as a function of the applied voltage.

If, for instance, the light-sensitive element is a photodiode biased in the backward direction, a sensor element which is activated only by a "light flash" is obtained if, for instance, a liquid-crystal element is used which reflects the incident light if the applied voltage is high and is connected in parallel with the photodiode.

After operating voltage is applied, the photodiode is not illuminated, so that the resistance is high as compared to the fixed resistor. The high voltage dropping across the unilluminated photodiode is also present at the liquid-crystal element so that the latter reflects. Thus, no or only little light can get to the photodiode in the base condition. However, if a light flash occurs, the light intensity which passes through the liquid-crystal element reflecting with a high degree of deflection and arrives at the photodiode is comparatively great, so that the voltage drop across the photodiode is reduced. Now, no high voltage is present any longer at the liquid crystal element so that the latter changes from the reflecting state to the largely transparent state. Thus, a relatively low light intensity after the occurrence of a light flash is already sufficient to keep the sensor element designed in accordance with the invention at that operating state to which the light sensitive element or the photodiode had been brought by the incident light flash.

A light control circuit, for instance, can also be realized which is activated by the occurrence of a light flash, in accordance with the invention. This light control circuit is furthermore deactivated by an illumination failure.

In a sensor element according to the invention, one embodiment of a light modulator, for instance, a liquid crystal element, can be used that reflects if the applied voltage is low and can be switched to the largely transparent state by high voltage.

In either case, however, the sensor element according to the invention requires only three elements, namely, a fixed resistor and a light-sensitive element which form a voltage divider, as well as a light modulator, for instance, a liquid crystal element which is shunted across a branch of the voltage divider and the light reflection, absorption and/or transmission of which changes as a function of the applied voltage, preferably at a steep slope. This simple design of the sensor element according to the invention therefore permits the integration of a large number of similar sensor elements in an array from a point of view of cost as well as from aspects of geometry. With such an array, an electronic drawing board, for instance, can be realized.

BRIEF DESCRIPTION OF THE DRAWINGS

The invention will be explained in greater detail in the following detailed description, with reference to the drawings, in which.

DETAILED DESCRIPTION

Figure 1A:
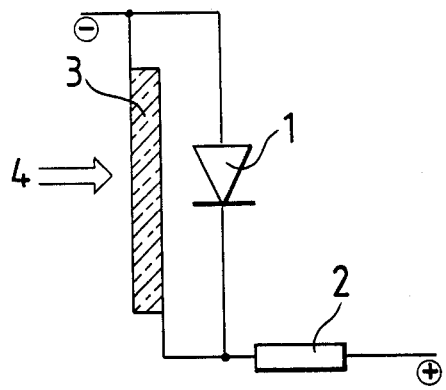
FIGS. 1a and 1b show the basic circuit diagram of sensor elements according to the invention.
Figure 1B:
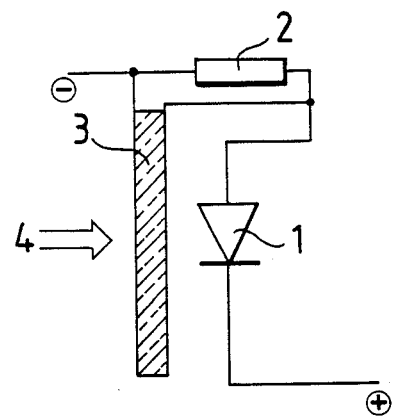

In FIG. 1a, a liquid crystal element 3 is shunted across the photodiode 1 and in FIG. 1b, across the fixed resistor 2. The liquid crystal element 3 is arranged so that light 4 can strike the photodiode 1 only if it has passed through the liquid crystal element 3.

With the basic circuits of the sensor element according to the invention shown in FIGS. 1a and 1b, the most varied "memory functions" can be realized if, for one, liquid crystal elements are used which reflect the incident light 4 if the applied voltage is high, and in the other case, liquid crystal elements which reflect the light if the incident voltage is low.

If, for instance, a liquid crystal element 3 is used which reflects the incident light if the applied voltage is high and is transparent for the incident light if the voltage is low, a light sensor is obtained with the circuit shown in FIG. 1a which is switched on by a "light flash" and switched off if the light stops.

If a liquid crystal element is used which reflects if low voltages are applied, the same function is obtained with the basic circuit shown in FIG. 1b, i.e., a light sensor which is switched-on by light flashes and is switched off when the light stops.

If a liquid crystal element is used which reflects if the applied voltage is low in the basic circuit shown in FIG. 1a, a sensor element is obtained which remembers "cessation of light". The same function is obtained if a liquid crystal element is used in the basic circuit shown in FIG. 1b, which reflects if the applied voltage is high.

In either case, the operation of the sensor elements of FIGS. 1a and 1b according to the invention is based on the fact that the ground state in which the sensor element is found after the operating voltage is switched on is maintained until an abnormal event occurs, namely, a light flash or stoppage of light: Due to a light flash, for instance, as much light gets to the photodiode 1 also with a reflecting liquid crystal element, that the voltage division at the voltage divider formed by the elements 1 and 2 is reversed. This new state, in which the photodiode can be employed, for instance, as a light control element is likewise maintained until an abnormal event of the opposite type, for instance, a light failure occurs which then transfers the sensor element back into the original ground state.

Figure 2:
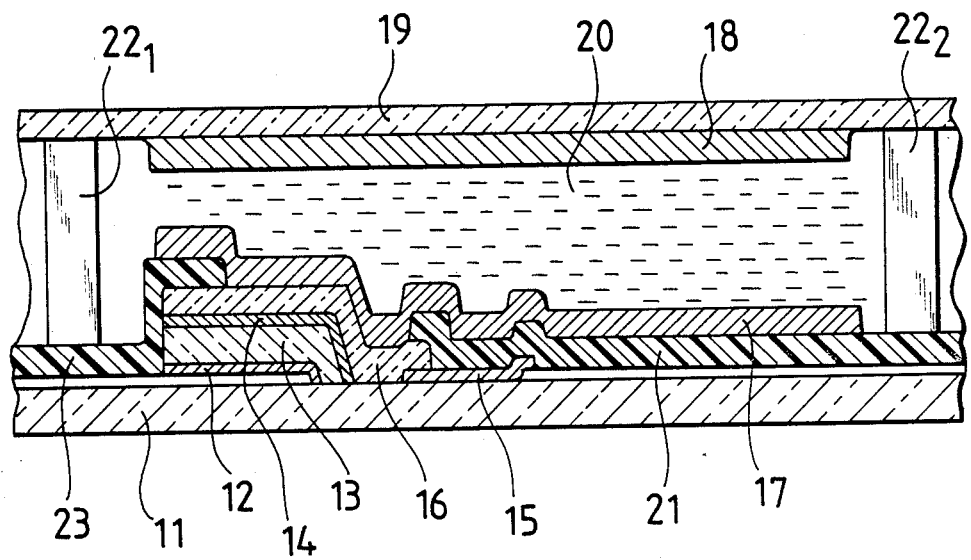
FIG. 2 shows the realization of a sensor element according to the invention in thin-film technology.

FIG. 2 shows a realization of the sensor element according to the invention in thin-film technology. To a substrate 11 is applied, for forming a diode 1, a metallization layer 12, thereupon an amorphous silicon layer 13 and to the latter, a transparent electrode 14. The amorphous silicon layer forms the PIN diode 1.

The resistor 2 is formed by a p+ or an n+—layer 15. For the electrical connection of the PIN diode and the resistance layer 15 serves the transparent TCO electrode 16 (TCO: transparent conducting oxide). For realizing the liquid crystal element 3, an electrode layer 17 which is separated from the conductor run 16 by the insulating layer 21, a TCO electrode 17 as well as a further electrode layer 18 are applied to a cover plate 19 consisting of glass. The liquid crystal 20 proper is located between these two electrode layers 17 and 18.

In the embodiment shown in FIG. 2, the circuits shown in FIGS. 1a and 1b are realized, depending on whether the upper electrode of the liquid crystal is electrically connected to the metal layer 12 or 16. The thin-film realization shown in FIG. 2 further comprises spacers $22_1$ and $22_2$ between the substrate 11 and the cover plate 19. Further insulation 23 serves for preventing undesired electrical shunts.

The thin-film realization shown in FIG. 2 is not only easy to fabricate but also makes possible the cost-effective realization of an array of sensor elements according to the invention.

Figure 3:
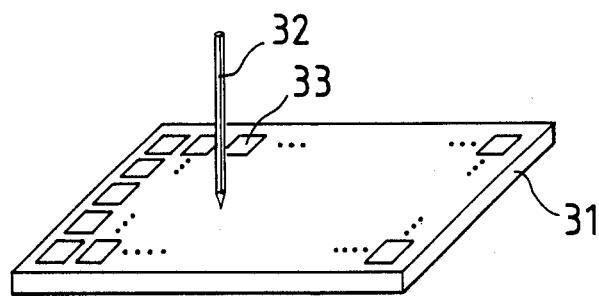
FIG. 3 shows the basic design of an electronic drawing board, using sensor elements according to the invention.

FIG. 3 shows an application for such an array. Such an array can be used, for instance, as an electronic drawing board 31 which is constructed so that a line painted on the drawing board by a light stylus 32 is stored and displayed by the drawing board. Depending on the wiring, it is also possible to erase lines or to interrogate and display data from a computer electronically.

In any case, each individual sensor element 33 which is constructed according to FIG. 1 or 2 indicates its change of state in memory if it is illuminated by the light of the light stylus.

The invention has been described above with the aid of embodiments by way of example. Within the scope of the invention, to construct a voltage divider circuit from a fixed resistor and a light-sensitive element and to shunt across one of the elements of the voltage divider circuit a cell, the reflection, absorption or transmission behavior of which changes as a function of the applied voltage and through which the light path to the light-sensitive element leads, the most varied modifications are, of course, possible.

Thus, the fixed resistor and the light-sensitive element, for instance, a photodiode, can, of course, also be realized in a technology different from the thin-film technology described. For instance, a pn photodiode can be used as the light sensitive diode; the fixed resistor can also be a discrete resistance element.

A Pockels cell, for instance, can also be used as the light modulator instead of the liquid crystal used in the embodiments described.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A sensor element having a memory for changes of the incident light intensity, comprising a light-sensitive element connected in series with a resistor, either the light-sensitive element or the resistor being shunted by a light modulator which influences the light incident on the light-sensitive element, said modulator having a reflection, absorption and/or transmission behavior which changes as a function of the voltage applied to the modulator or the current through the modulator.

2. The sensor element recited in claim 1, wherein the light modulator is arranged in front of the light-sensitive element.

3. The sensor element recited in claim 1 wherein the light modulator comprises a liquid-crystal element.

4. The sensor element recited in claim 1, wherein the light-sensitive element comprises a photodiode biased in the backward direction.

5. The sensor element recited in claim 1, wherein, for the storage of light flashes or light failure, the light modulator reflects the inncident light if the applied voltage is high, and is connected in parallel with the light-sensitive element.

6. The sensor element recited in claim 1, wherein the light modulator reflects the incident-light if the applied voltage is low, and is connected in parallel with the resistor, thereby providing storage for incident light flashes.

7. The sensor element recited in claim 7, wherein the light-sensitive element and the resistor are fabricated by a thin-film technique.

8. An electronic drawing board in which drawings are generated by a light stylus directed at the board, information generated by the board being transmittable to an information receiving device, for example, a computer, the board comprising a plurality of sensor elements arranged on a common substrate, each of said sensor elements comprising a light-sensitive element connected in series with a resistor, either the light sensitive element or the resistor being shunted by a light modulator which influences the light incident on the light-sensitive element, said modulator having a reflection, absorption and/or transmission behavior which changes as a function of the voltage applied to the modulator or the current through the modulator.

9. The electronic drawing board recited in claim 8, wherein the light modulator is arranged in front of the light-sensitive element.

10. The electronic drawing board recited in claim 8 wherein the light modulator comprises a liquid-crystal element.

11. The electronic drawing board recited in claim 8, wherein the light-sensitive element comprises a photodiode biased in the backward direction.

12. The electronic drawing board recited in claim 8, wherein, for the storage of light flashes or light failure, the light modulator reflects the incident light if the applied voltage is high, and is connected in parallel with the light-sensitive element.

13. The electronic drawing board recited in claim 8, wherein the light modulator reflects the incident light if the applied voltage is low, and is connected in parallel with the resistor, thereby providing storage for incident light flashes.

14. The electronic drawing board recited in claim 8, wherein the light-sensitive element and the resistor are fabricated by a thin-film technique.

* * * * *

UNITED STATES PATENT AND TRADEMARK OFFICE
CERTIFICATE OF CORRECTION

PATENT NO. : 4,846,559

DATED : July 11, 1989

INVENTOR(S) : Norbert Kniffler

It is certified that error appears in the above-identified patent and that said Letters Patent is hereby corrected as shown below:

In Column 1, line 65, change "...and is utilzied" to read --...and is utilized--

In Column 5, line 11, (claim 7), change "... recited in claim 7" to read --recited in claim 1--

Signed and Sealed this

Thirty-first Day of July, 1990

Attest:

HARRY F. MANBECK, JR.

*Attesting Officer*  *Commissioner of Patents and Trademarks*